March 31, 1936. G. DRAUZ 2,035,800
BODY FOR POWER VEHICLES
Filed Sept. 21, 1932  3 Sheets-Sheet 1
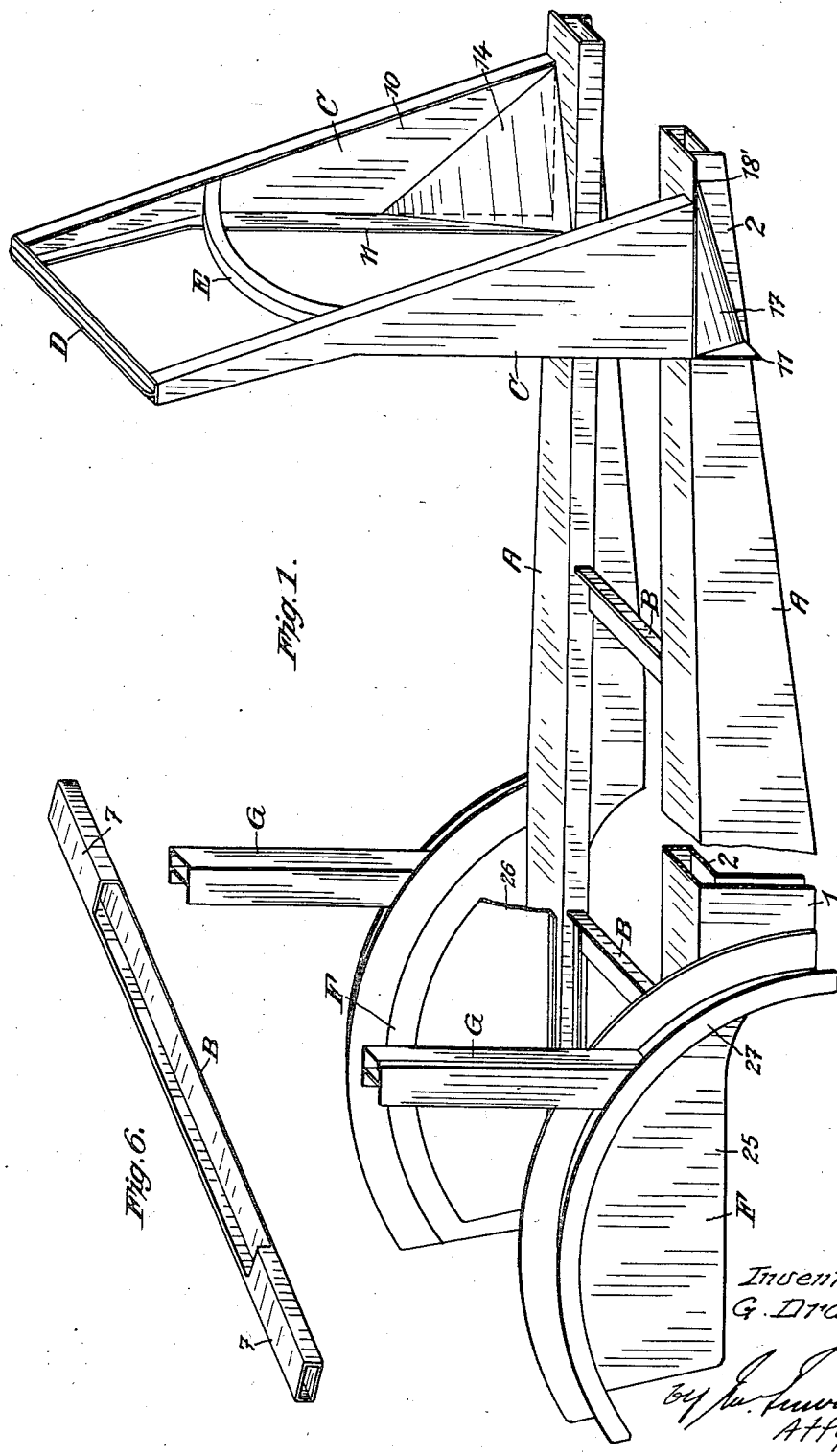

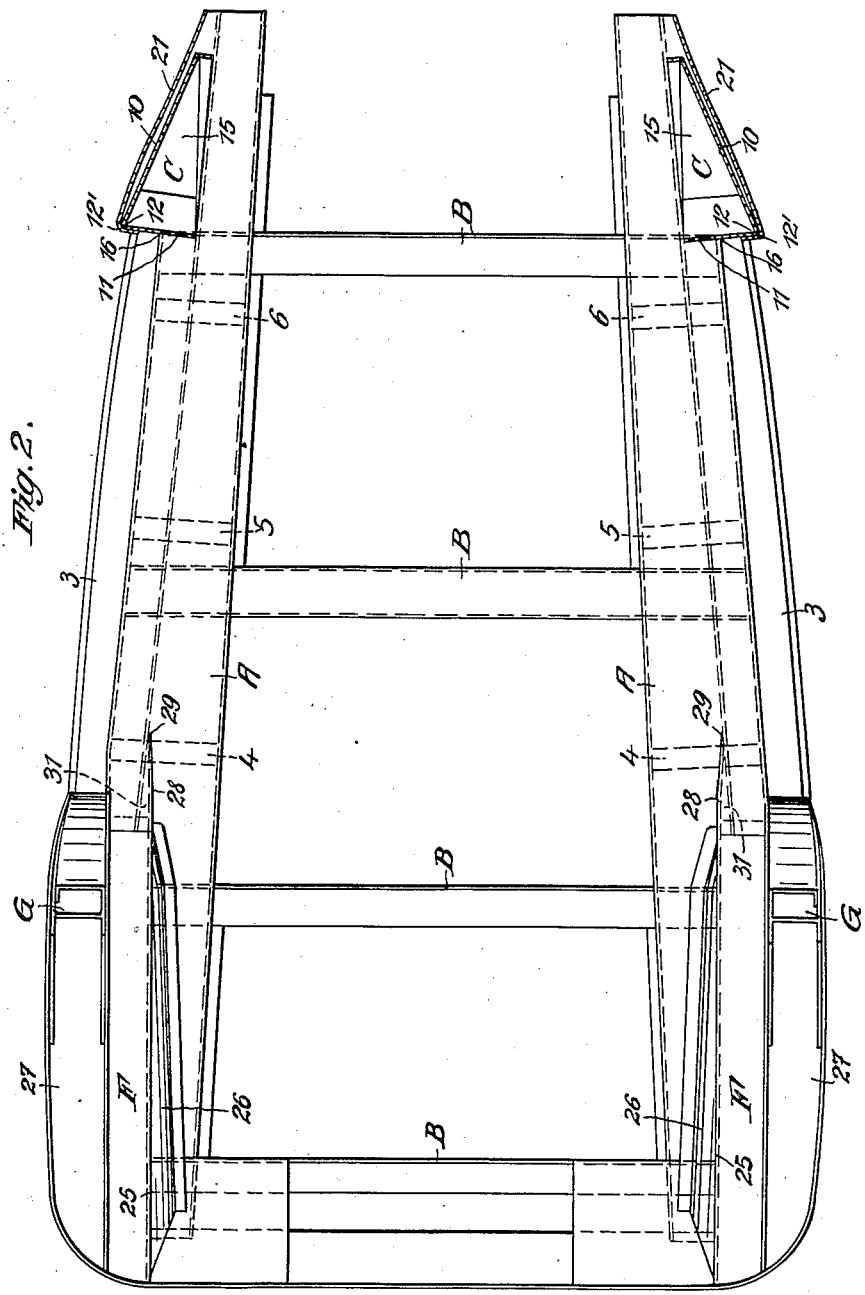

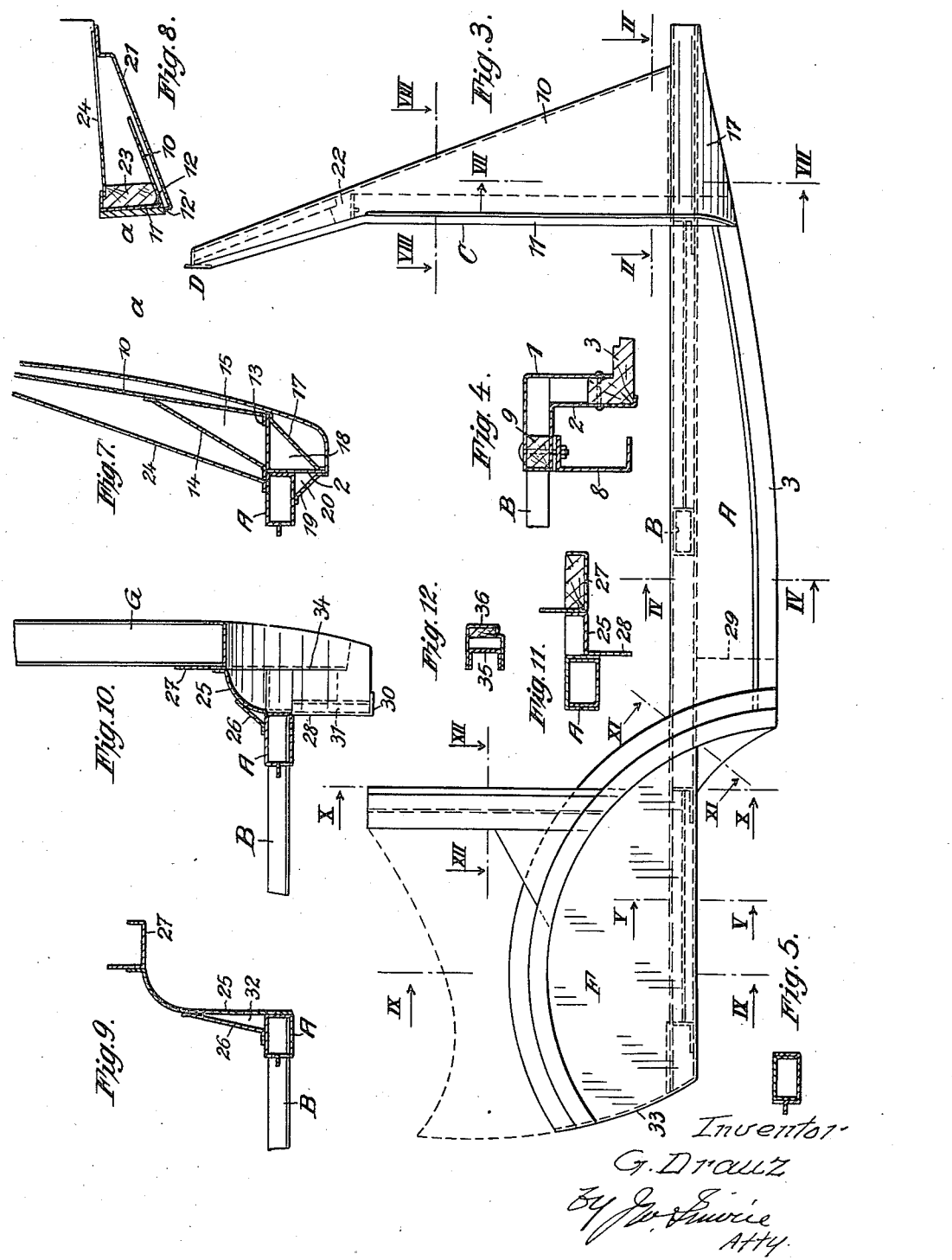

Patented Mar. 31, 1936

2,035,800

UNITED STATES PATENT OFFICE 2,035,800

BODY FOR POWER VEHICLES

Gustav Drauz, Heilbronn-on-the-Neckar, Germany

Application September 21, 1932, Serial No. 634,254
In Germany September 25, 1931

8 Claims. (Cl. 296—28)

This invention relates to a body for power vehicles in which the frame of the lower portion of the body and the vertical supporting columns arranged upon said frame, especially the front wall columns and the door posts, consist of sheet-metal plates.

The object of the invention consists, first of all, therein to design the longitudinal girders of the frame of the lower portion of the body in such a manner that they have a low weight, but are, nevertheless, resistive, and to reinforce at the same time the strength of the junctions between said vertical supporting posts and said body frame portion.

Another object of the invention consists therein to prevent the arising of noises in the body frame.

Furthermore, the invention has the object to provide a secure transverse junction of low weight between the longitudinal girders of the said lower portion of the body frame.

The invention is illustrated diagrammatically and by way of example on the accompanying drawings on which Figure 1 is a perspective view of a body frame work designed according to this invention.

Figure 2 is partly a plan of that body frame work and partly a horizontal section therethrough in the plane II—II of Fig. 3.

Figure 3 is a side-view of said body frame work.

Figures 4 and 5 are sections through one of the longitudinal girders of the body frame in the planes IV—IV and V—V of Fig. 3.

Figure 6 is a perspective view of one of the transverse girders of the lower portion of the body frame.

Figures 7 and 8 are sections through the front wall post in the planes VII—VII and VIII—VIII of Fig. 3.

Figures 9, 10 and 11 are sections through the wheel casing and the rear portion of the longitudinal girder in the planes IX—IX, X—X and XI—XI of Fig. 3; and Figure 12 is a section through the door post in the plane XII—XII of Fig. 3.

The body frame work comprises two longitudinal girders A which are connected with one another by transverse girders B. To the front ends of the longitudinal girders A are attached the front wall posts C, which are connected with one another by transverse members D and E in order to form the front wall that receives the driver's window. At the rear end of the longitudinal girders A are affixed the wheel casings F, upon which are arranged the door posts G.

The longitudinal girders consist each of two angularly bent sheet-metal members 1 and 2 (Fig. 4) which at their inner sides are connected with one another by spot-welding. These two members together form a hollow angle which is open at its lower end and receives in the thus formed opening a wooden sill 3 that is designed as door sill. In the transverse direction of the longitudinal girder A U-shaped reinforcing ribs 4, 5 and 6 (Fig. 2) are inserted.

The transverse girders B extend with their ends between the horizontal legs of the angular sheet-metal members 1 and 2 and end at the vertical wall of the exterior sheet-metal member 1 (Fig. 4). At least several of the transverse girders have at their ends 7 (Fig. 6) square hollow shape so that they can be welded together with the legs of said angular sheet-metal members at the upper and the lower side of the same. Where the frame of the vehicle body is connected by screws with the chassis frame 8 (Fig. 4), there wooden filling members 9 are inserted in order to prevent the girder from being compressed when the screws are drawn home. The strength of the longitudinal girder is increased in this way.

The frame bond designed according to this invention assists considerably, owing to its resisting capacity, the chassis which is subjected to twists by reason of the unevenness of the road. Furthermore, also the bending stiffness and the twisting stiffness of the longitudinal girders are greatly increased by the tubular transverse section of the body frame being closed by the wooden door sill. It is known from experience that the bending and the twisting stiffness of tubes are increased quite extraordinarily if the tubes are partly filled up with wood.

Another advantage presented by the employment of a wooden sill for connecting the angular sheet-metal members of the longitudinal girders with one another is this that the wooden sills annihilate noise.

Finally, the above-described vehicle body frame is particularly suited for accommodation to the varying forms of vehicle bodies and chassis as brought out by way of changes of fashion.

The posts C of the front wall consist, as regards their basis, of two sheet-metal members 10 and 11 (Figs. 2 and 8) arranged at an angle with respect to one another. These two members are butt-welded at 12 along their entire length. They may consist, however, also of an angularly bent sheet-metal member. The sheet-metal member 11 is arranged at right angles with respect to the door window line a—a (Fig. 8). The broad post sheet-metal member 10 is bent off angularly at the upper edge of the longitudinal girder A and welded at 13 to the upper surface of the longitudinal girder A of the frame (Fig. 7). The sheet-metal member 11 extends downwardly to below the girder A, as far as to the lower edge of the high-sheet-metal member 2 (Fig. 7) pertaining to the longitudinal girder. On the upper side of the longitudinal girder A a triangular corner piece 14 (Figs. 1 and 7) of sheet-metal is welded in between said girder A and the post sheet-metal member 10, said member 14 enclosing a hollow space 15 (Fig. 2) together with the lower end of the sheet-metal member 10 and the upper side of the girder. There is, thus, formed upon the upper side of the girder A a fastening cap enclosing a hollow space.

As has already been said, the side 11 extends downwardly to the lowermost edge of the girder A. At 16 the side 11 is welded together in a corner with the upper sheet-metal frame member of the longitudinal girder A. Between the downwardly extending sheet-metal member 11 and the also downwardly extending sheet-metal member 2, a sheet-metal corner piece 17 is inserted exteriorly in such a manner that a hollow space 18 is formed. At the rear end said corner piece 17 is welded together with the side 11 of the post, whereas it terminates at its front into the corner 18' (Fig. 1). If there is sufficient space on the inner side of the lower body frame portion, another sheet-metal corner piece 19 (Fig. 7) can be applied to the two lower surfaces of the longitudinal frame girder so that another hollow space 20 is produced.

The shell or outer skin 21 is located somewhat remote from the sheet-metal member 10 pertaining to the post so that dampening means can be inserted between the members 10 and 21. The rim 12' of the shell 21 is angularly bent and there welded together with the member 11. Prior to the stretching of the shell plate 21 the transverse member E which encompasses a wooden frame 22 is inserted into the front wall. Said wooden frame serves on the one hand for fastening the upper portion of the shell 21 and on the other hand for the reception of the driver's window.

The posts C are preferably provided with light wooden fillings 23 (Fig. 8) which are connected with the sheet-metal members 10 and 11 by screws. It is, furthermore, also suited to the purpose in view to support said posts at their inner side by a thin sheet-metal wall 24 (Figs. 7 and 8) which is on its one side welded together with the post plate 11 and on its other side with the shell or jacket 21.

The corner caps designed as hollow bodies, as described, and located at the places of junction between the front wall posts and the longitudinal girders of the frame afford to the front wall an extraordinarily great bending and twisting stiffness. This great strength is of very great importance, as has been ascertained by trials, in that concerning the design of the front wall less the strength of the front wall posts per se, than the solid and tight connection of the same with the longitudinal girders is of prominent value. Concerning the junction between the front wall posts and the longitudinal girders the extent or size and the kind of the lower supporting surface is of decisive importance. By arranging and combining the parts concerned in the above-described manner an unobjectionable front wall can be attained with comparatively thin sheet-metal members for the front wall posts themselves.

The heavy doors held by the posts G constitute heavy loads especially for the wheel casings, and in view of this particular attention has been paid to the design thereof and to their connection with the longitudinal girders especially as regards the annihilation of the jerky shocks and the shakes which act detrimentally upon the wheel casings. A wheel casing designed according to this invention is composed of the parts 25, 26 and 27, of which 25 constitutes the main wall of the casing, 26 an interior stiffening wall, and 27 the wheel casing profile bow. The wall 25 is at its lower end welded together with the outer wall of the horizontal leg of the girder A of the frame, and at its front end it is provided with a lug 28 which is along its upper edge welded together with the lower wall of the horizontal part of the longitudinal girder A, whereas the front edge 29 of the lug 28 is welded together with the vertical leg of said girder A. The lower rim 30 (Fig. 10) of this lug is bent and welded together with the lower rim of the vertical leg of the said girder. There is thus formed by the lug 28 a hollow space 31 (Figs. 2 and 10), the horizontal section of which has the shape of a triangle. Owing to the entrance of the wheel casing, the strength of the rear part of the longitudinal girder A is so much reduced that it forms nothing else but a horizontal leg, as shown in Figs. 5, 9 and 10. For compensating this reduction of the strength, the inner stiffening wall 26 (Figs. 1, 2, 9 and 10) is connected with the upper wall of the longitudinal girder A and with the wheel casing wall 25 in such a manner that it crosses inwardly and in oblique direction the upper wall of said longitudinal girder and is in this position welded together with this wall, whereas said wall 26 is at its upper part welded together with the wall 25 of the wheel-casing. Owing to the insertion of the stiffening wall 26 a hollow space 32 (Fig. 9) of triangular transverse section is formed, this space enlarging rearwardly, by reason of the oblique position, until it is closed by the cap 33 (Fig. 3).

The profiled bow 27 which is curved according to the wheel curve is connected with the upper rim of the wheel casing by welding. Said bow is at its inner high flank, at the frontal portion 34 (Fig. 10), connected with the vertical leg of the longitudinal girder A, and is at its rear connected with the cap 33. The front part of the profiled bow, viz. that part which is curved downwardly from the door post and forms the post foot, serves at the same time as door guide; the above-mentioned flank may be used, if desired, as door abutment.

The connection of the door post G with the wheel casing, when designed according to this invention, can be regarded as equivalent to a direct connection with the longitudinal girder of L-shaped section. The lower end of the door post is affixed by welding between the flanks of the profiled bow 27. The door post itself is U-shaped in section (Fig. 12), and in its interior are provided a transverse wall 35 and a wooden filling 36, and owing to the above-mentioned stiffening wall 26 which is arranged in sloping position in oblique direction there is, besides the outer wall of the longitudinal girder, also the upper side of the rear end of this girder utilized in its entire length and breadth as supporting surface so that an extraordinarily great stableness of the wheel casing is attained. An effective assistance against the action of lateral forces and of twisting forces arising at the rear door post is afforded to the longitudinal girder by the forwardly extending lug 28 which is on all sides welded together with the inner vertical leg of the longitudinal girder, forming therewith a hollow space of triangular transverse section, whereby, as it were, an artificial transmission of the vertical legs of the longitudinal girders into the weak horizontal leg ends takes place and the wheel casing is transformed into a double-walled one. The longitudinal girder is in this way rendered sufficiently resistive against all here arising bending and twisting forces, and there is, thus, obtained a reliable basis for an unobjectionable fastening and a stable hold of the door post. The lever forces of this post are considerable owing to the broad and, therefore, heavy doors hanging at said post, and this being so, it is necessary that they must be taken up and annihilated by the longitudinal girder. The unvariable safe location and the friction-proof connection between the rear door post and the body frame are the proposition for unobjectionable operation of the doors and the parts forming the top of the car body, as well as for the length of life of this body as such.

I claim:

1. A body for power vehicles, comprising, in combination with a lower body frame consisting of sheet-metal, and with supporting columns, hollow longitudinal girders forming parts of this frame and consisting each of two angularly bent sheet-metal members forming when being assembled a hollow body of angular section; wooden sills fastened between the downwardly directed parts of the said angularly bent sheet-metal members.

2. A body for power vehicles, comprising, in combination with a lower body frame consisting of sheet-metal, and with supporting columns, hollow longitudinal girders forming parts of this frame and consisting each of two angularly bent sheet-metal members forming when being assembled a hollow body of angular section; wooden sills fastened between the downwardly directed parts of the said angularly bent sheet-metal members, and being so designed as to constitute door sills.

3. A body for power vehicles, comprising, in combination with a lower body frame consisting of sheet-metal, and with supporting columns, hollow longitudinal girders forming parts of this frame and consisting each of two angularly bent sheet-metal members forming when being assembled a hollow body of angular section, transverse girders also forming parts of said lower body frame and connecting the said longitudinal girders with one another and being so arranged that their ends lie between the horizontal legs of said angularly bent sheet-metal members, these ends forming square hollow bodies and being welded together with said legs and the middle portions of said transverse girders having angular shape.

4. A body for power vehicles, comprising, in combination with a lower body frame containing longitudinal girders and front wall columns consisting of sheet-metal members forming angles with one another and being welded together, triangular sheet-metal members connecting said columns with the said longitudinal girders and forming hollow spaces with these girders, and a supporting sheet-metal member provided at the inner side of each of said front wall columns and being connected at its rear edge with the adjacent post sheet-metal member and at its front edge with the adjacent portion of the sheet-metal shell of the vehicle body.

5. A body for power vehicles, comprising in combination with a lower body frame containing longitudinal girders and wheel-casings, a sheet-metal wall being welded together with the upper part of the rear wall of each of the wheel-casings and with the upper wall of the horizontal leg of the said longitudinal girders, and being so arranged as to enclose a closed pyramidal hollow space with said rear wall, and a door-post arranged on each of said wheel-casings.

6. A body for power vehicles, comprising in combination with a lower body frame containing longitudinal girders of angular section and wheel-casings, a sheet-metal wall being welded together with the upper part of the rear wall of each of the wheel-casings and with the upper wall of the horizontal leg of the said longitudinal girders, and being so arranged as to enclose a closed pyramidal hollow space with said rear wall, a lug extending forwardly from the front part of the rear wall of each wheel-casing and being welded together with the lower wall of the horizontal leg of the said longitudinal girder and forming with the vertical leg of this girder a closed pyramidal hollow space and being welded together with said latter leg and a door-post arranged on each of said wheel-casings.

7. A body for power vehicles comprising a lower body frame of sheet metal including hollow longitudinal girders, sheet metal supporting columns secured to said lower body frame, and triangular sheet metal members arranged at the juncture of said girders and said columns, said members being inclined in two directions to form closed pyramidal hollow spaces relative to said girders and columns.

8. A body for power vehicles, comprising in combination a lower body frame including longitudinal girders, front wall columns consisting of sheet metal members forming angles with one another and welded together, said wall columns being secured to the lower body frame, and triangular sheet metal members connecting said columns and said longitudinal girders, said members being inclined in two directions to form closed pyramidal hollow spaces relative to said girders and columns.

GUSTAV DRAUZ.